(12) United States Patent
Schreter

(10) Patent No.: US 9,053,153 B2
(45) Date of Patent: Jun. 9, 2015

(54) INTER-QUERY PARALLELIZATION OF CONSTRAINT CHECKING

(75) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 12 days.

(21) Appl. No.: 13/525,935

(22) Filed: Jun. 18, 2012

(65) Prior Publication Data

US 2013/0339312 A1   Dec. 19, 2013

(51) Int. Cl.
*G06F 17/00* (2006.01)
*G06F 17/30* (2006.01)

(52) U.S. Cl.
CPC ...... *G06F 17/3051* (2013.01); *G06F 17/30445* (2013.01)

(58) Field of Classification Search
CPC ..................... G06F 17/30445; G06F 17/30348
USPC ................... 707/687, 999.003, 695, 703, 704
See application file for complete search history.

(56) References Cited

U.S. PATENT DOCUMENTS

| | | | | |
|---|---|---|---|---|
| 4,947,320 A * | 8/1990 | Crus et al. | | 1/1 |
| 5,706,494 A * | 1/1998 | Cochrane et al. | | 1/1 |
| 6,115,722 A * | 9/2000 | Isip et al. | | 1/1 |
| 6,295,539 B1 * | 9/2001 | Isip, Jr. | | 1/1 |
| 6,374,236 B1 * | 4/2002 | Chen et al. | | 1/1 |
| 6,453,314 B1 * | 9/2002 | Chan et al. | | 1/1 |
| 7,028,057 B1 * | 4/2006 | Vasudevan et al. | | 707/695 |
| 7,113,953 B2 * | 9/2006 | Brown et al. | | 707/615 |
| 7,240,054 B2 * | 7/2007 | Adiba et al. | | 1/1 |
| 8,301,934 B1 * | 10/2012 | Ramesh et al. | | 714/18 |
| 8,336,051 B2 * | 12/2012 | Gokulakannan | | 718/101 |
| 8,375,047 B2 * | 2/2013 | Narayanan et al. | | 707/764 |
| 2002/0174108 A1 * | 11/2002 | Cotner et al. | | 707/3 |
| 2004/0010502 A1 * | 1/2004 | Bomfim et al. | | 707/100 |
| 2005/0131893 A1 * | 6/2005 | Von Glan | | 707/5 |
| 2006/0212465 A1 * | 9/2006 | Fish et al. | | 707/101 |
| 2007/0239661 A1 * | 10/2007 | Cattell et al. | | 707/2 |
| 2009/0037498 A1 * | 2/2009 | Mukherjee et al. | | 707/205 |
| 2010/0005077 A1 * | 1/2010 | Krishnamurthy et al. | | 707/4 |
| 2011/0010330 A1 * | 1/2011 | McCline et al. | | 707/602 |
| 2012/0254887 A1 * | 10/2012 | Rodriguez | | 718/106 |
| 2012/0265728 A1 * | 10/2012 | Plattner et al. | | 707/607 |
| 2012/0278282 A1 * | 11/2012 | Lu et al. | | 707/634 |
| 2012/0310985 A1 * | 12/2012 | Gale et al. | | 707/792 |
| 2012/0323971 A1 * | 12/2012 | Pasupuleti | | 707/802 |

\* cited by examiner

*Primary Examiner* — Miranda Le
(74) *Attorney, Agent, or Firm* — Mintz Levin Cohn Ferris Glovsky and Popeo, P.C.

(57) ABSTRACT

A plurality of operations are executed on tables of a database with at least a portion of the operations being executed in parallel. A constraint check is performed for each operation subsequent to its execution to determine whether data stored in the database affected by the operation is valid, during this constraint checking additional operations and/or constraint checks on the same table are allowed to run in parallel. Based on this constraint checking, operations for which the constraint check determines that the data is not valid are invalidated. Related apparatus, systems, techniques and articles are also described.

21 Claims, 3 Drawing Sheets

INTER-QUERY PARALLELIZATION OF CONSTRAINT CHECKING

TECHNICAL FIELD

The subject matter described herein relates to techniques for parallelization of database constraint checking.

BACKGROUND

Relational databases allow defining constraints on data, such as uniqueness check, referential integrity check or value domain checks. These constraints need to be checked during insertion or update of the data in the database. Since database tables are inherently shared structures, it's not easy to parallelize constraint checking inter-query, except simple value domain checks, which are out-of-scope for this application.

Checking constraints normally doesn't pose any serious problem in "normal" databases, where the execution time is by far dominated by I/O time. However, with in-memory databases, the situation is different. Since no disk I/O is involved and CPU power is abundant, lack of inter-query parallelization of constraint checking can seriously hamper performance.

SUMMARY

In one aspect, a plurality of operations are executed on tables of a database with at least a portion of the operations being executed in parallel. A constraint check is performed for each operation subsequent to its execution to determine whether data stored in the database affected by the operation is valid. Based on this constraint checking, operations for which the constraint check determines that the data is not valid are invalidated.

At least a portion of the constraint checks are performed in parallel to execution of additional operations and/or constraint checks. Rows of the database can be given monotonically-increasing row identifiers. The database can use multi-version concurrency control. The operations can be selected from a group consisting of insert, update, and delete operations. For each insert or update operation, the corresponding constraint check can be limited to row identifiers existing prior to the execution of the corresponding operation. Invalidating operations can include, for example, executing the corresponding operation in a substransaction, and performing a substransaction rollback for the corresponding operation in case of a failed constraint check.

For each row in the database, it can be identified whether the row has been fully checked. In such cases, the constraint checks can be performed, for example, by: determining that an operation violating the constraint check against a row in the database identified as being fully checked indicates a definitive constraint violation, and determining that an operation violating the constraint check against a row in the database not identified as being fully checked requires a recheck after the row is fully checked. The constraint checks can be repeated if the operation violated a constraint check against a row in the database which was not identified as being fully checked at such time as the corresponding row is identified as being fully checked.

The database can be an in-memory database. The constraint checks can be, for example, uniqueness checks, referential integrity checks, and value domain checks.

In an interrelated aspect, a plurality of query operations are executed on tables of a database with at least a portion of the operations being executed in parallel. Thereafter, parallelized inter-query and intra-query constraint checks are performed for the operations. Operations for which the constraint check determines the operation is not valid are invalidated.

Articles of manufacture are also described that comprise computer executable instructions permanently stored on non-transitory computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages. For example, the current subject matter allows for a much more rapid execution of database operations by subsequently performing constraint checks which can require significant upfront processing time (especially with in-memory databases).

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
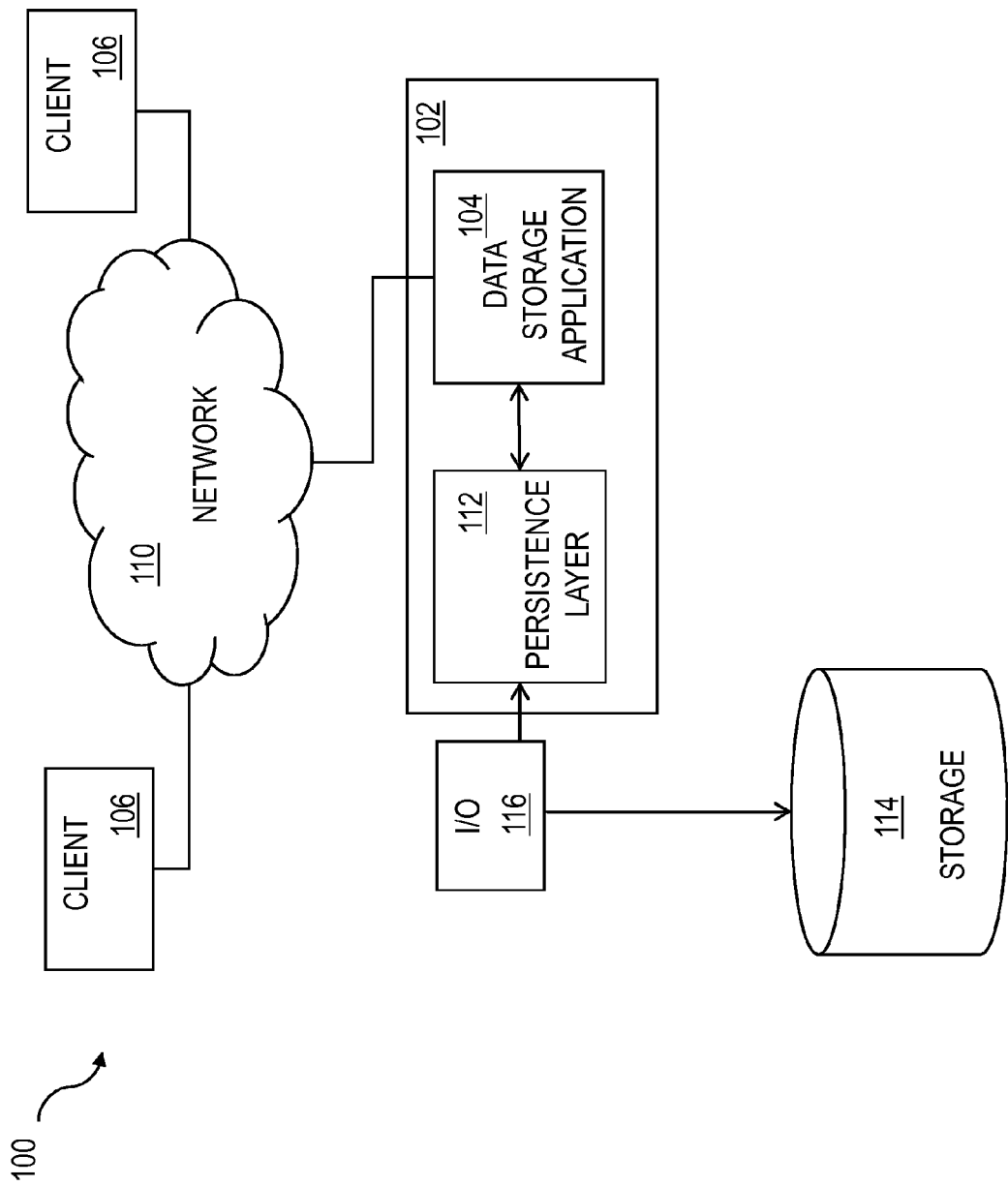
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
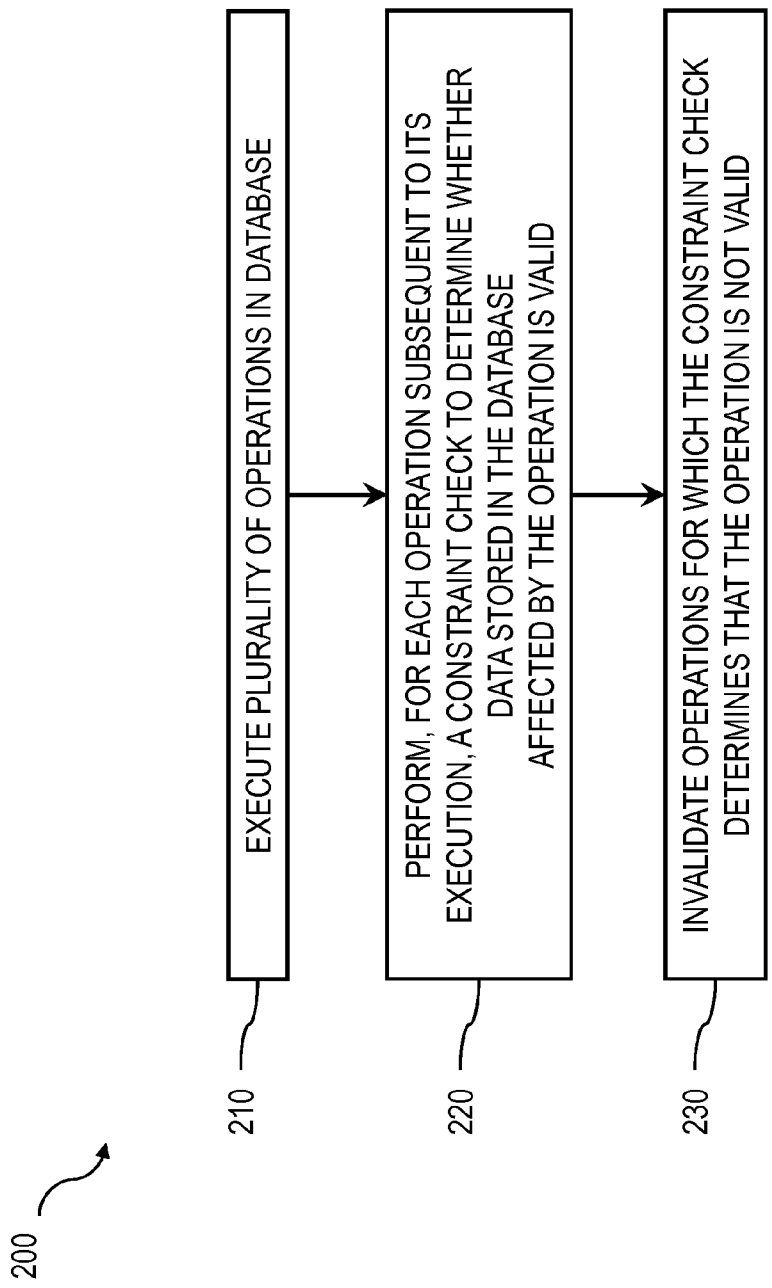
FIG. 2 is a process flow diagram illustrating a technique for intra-query parallelization of constraint checking.

FIG. 2 is a process flow diagram 200 in which, at 210, a plurality of operations are executed on tables of a database with at least a portion of the operations being executed in parallel. For each operation subsequent to its execution, at 220, a constraint check is performed to determine whether data stored in the database affected by the operation is valid. Subsequently, at 230, operations for which the constraint check determined that the data is not valid are invalidated. Appropriate data recovery measures can then be undertaken. Otherwise, further operations can be executed.

Figure 3:
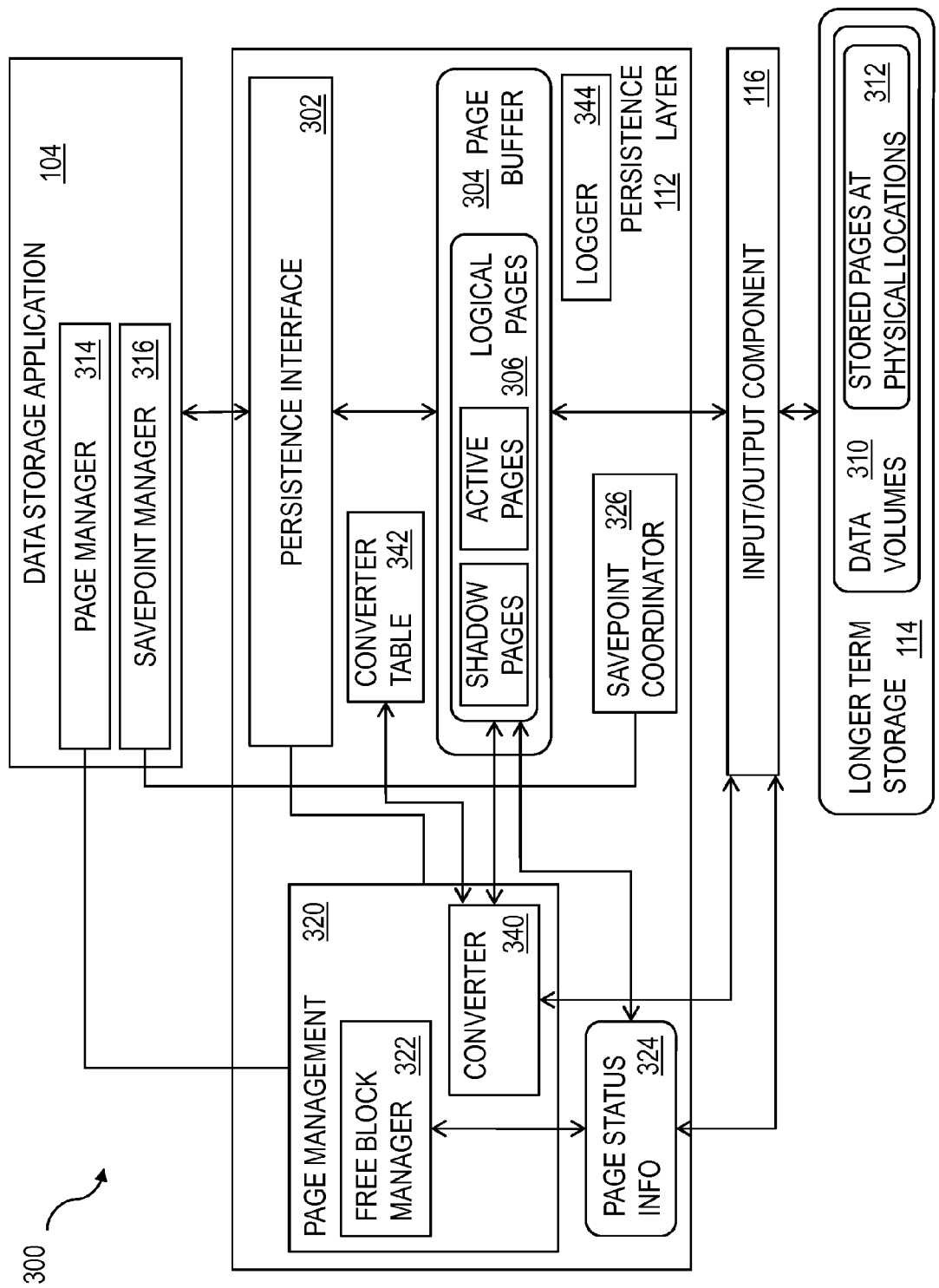
FIG. 3 is a diagram illustrating details of the system of FIG. 1.

FIG. 3 shows a software architecture 300 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 302. A page buffer 304 within the persistence layer 112 can store one or more logical pages 306, and optionally can include shadow pages, active pages, and the like. The logical pages 306 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 310 where stored pages 312 are allocated at physical memory blocks.

In some implementations, the data storage application 104 can include or be otherwise in communication with a page manager 314 and/or a savepoint manager 316. The page manager 314 can communicate with a page management module 320 at the persistence layer 112 that can include a free block manager 322 that monitors page status information 324, for example the status of physical pages within the storage 114 and logical pages in the persistence layer 112 (and optionally in the page buffer 304). The savepoint manager 316 can communicate with a savepoint coordinator 326 at the persistence layer 204 to handle savepoints, which are used to create a consistent persistent state of the database for restart after a possible crash.

In some implementations of a data storage application 104, the page management module of the persistence layer 112 can implement a shadow paging. The free block manager 322 within the page management module 320 can maintain the status of physical pages. The page buffer 304 can included a fixed page status buffer that operates as discussed herein. A converter component 340, which can be part of or in communication with the page management module 320, can be responsible for mapping between logical and physical pages written to the storage 114. The converter 340 can maintain the current mapping of logical pages to the corresponding physical pages in a converter table 342. The converter 340 can maintain a current mapping of logical pages 306 to the corresponding physical pages in one or more converter tables 342. When a logical page 306 is read from storage 114, the storage page to be loaded can be looked up from the one or more converter tables 342 using the converter 340. When a logical page is written to storage 114 the first time after a savepoint, a new free physical page is assigned to the logical page. The free block manager 322 marks the new physical page as "used" and the new mapping is stored in the one or more converter tables 342.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 344 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 344 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 112 can use a combination of undo log entries (from one or more logs) and shadow paging.

The persistence interface 302 can handle read and write requests of stores (e.g., in-memory stores, etc.). The persistence interface 302 can also provide write methods for writing data both with logging and without logging. If the logged write operations are used, the persistence interface 302 invokes the logger 344. In addition, the logger 344 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 344. For an entry of type "update", for example, this would be the identification of the affected record and the after image of the modified data.

When the data application 104 is restarted, the log entries need to be processed. To speed up this process the redo log is not always processed from the beginning Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 344 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 344 can write a database log (or simply referred to herein as a "log") sequentially into a memory buffer in natural order (e.g., sequential order, etc.). If several physical hard disks/storage devices are used to store log data, several log partitions can be defined. Thereafter, the logger 344 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 104 can use shadow paging so that the savepoint manager 316 can write a transactionally-consistent savepoint. With such an arrangement, a data backup comprises a copy of all data pages contained in a particular savepoint, which was done as the first step of the data backup process. The current subject matter can be also applied to other types of data page storage.

The data storage application 104 can utilize multi-version concurrent control (MVCC) for transaction isolation and consistent reading. Each row of the database can be associated with a unique, monotonically-increasing identifier (RowID). When a new version of the record is created, this new version can also become a new RowID (i.e., due to MVCC semantics, old versions must be kept for parallel readers and will be cleaned only during garbage collection after commit). In this sense, UPDATE operations can be seen as a combination of DELETE and INSERT operation (i.e., mark old row as deleted, insert new row). As will be described further, the current subject matter utilizes a combination of uniqueness check and referential integrity constraints.

Normally, each INSERT, UPDATE or DELETE operation acquires an exclusive lock on the internal, transient structures of the table, checks the constraints, if successful, inserts the new data to the table and/or marks old rows in the table deleted and releases the exclusive lock.

Various types of constraint checks can be performed such as uniqueness checks, referential integrity checks, and value domain checks. Constraint check for uniqueness must do either index access (if present) or a full-table scan to check whether the row with a same value or combination of values already exists. Referential integrity constraint check must do a check on the other side of the referential integrity relation to check whether referential integrity is satisfied, which also involves index access or a full table scan on the other table. With the current subject matter, several jobs can be started in parallel (i.e., constraint checking is parallelized intra-query, etc.) that perform constraint checks (which can be characterized as read operations). Referential integrity constraint can be also parallelized inter-query by placing shared locks on referred-to rows before actually executing the operation.

To parallelize constraint checking inter-query, an operation can be executed right away, without checking the constraint inside of the corresponding exclusive lock. Bypassing the constraint check significantly shortens exclusive lock time which allows many more operations on the table. Assuming one time unit for the operation proper and ten time units for constraint check, the classical approach to insert 100 rows in 100 parallel queries would require 1100 time units. If the constraint check is postponed to after the operation proper is done and parallelized by operation/query, same insert of 100 rows in 100 parallel queries would require only 110 time units, which is factor 10 better (actually, the ratio between time for constraint check and time for operation as such).

Each query inserting new rows in the table (remember, UPDATE is just DELETE+INSERT in MVCC) knows the minimum RowID inserted and also knows that latter queries become larger RowIDs (the queries serialize on the exclusive lock for reserving new rows in the table).

As an example, there are three queries inserting 10, 5 and 100 rows, respectively, executed in this order (lock acquired in this order). Assuming last generated RowID was 4711, then the first query will become RowIDs 4712-4721, second one 4722-4726 and the third one 4727-4826.

Now, each constraint check can run in parallel and must check only against rows with RowID<minimum RowID assigned in the query (same as if it were executed inside exclusive lock). That is, in this example, first query would check for constraint violation in range 0-4711, second one in range 0-4721 and third one in range 0-4726. If a constraint violation is found, then the operation is invalidated (e.g., by executing the INSERT/UPDATE operation in a subtransaction and in case of constraint violation, executing a subtransaction rollback).

Subtransaction is a kind of nested transaction inside of a transaction. Data can be modified in subtransaction and the subtransaction can be committed or rolled back, for example:
INSERT R1
Start subtrans
INSERT R2
Commit subtrans
INSERT R3
Commit In this case, all R1, R2 and R3 will be inserted in the database. In the case of rollback, for example:
INSERT R1
Start subtrans
INSERT R2
Rollback subtrans
INSERT R3
Commit Only R1 and R3 are inserted. At the time of rollback subtrans the new row R2 is invalidated, as if it were never inserted. Subtransactions can be also nested (nesting depth depends on implementation).

When two different constraints are checked on the table, two queries might add two different rows, where first query doesn't satisfy first constraint against old data and second query doesn't satisfy second constraint against the data from the first query (e.g., some uniqueness constraint). As the row inserted by the first query will be rolled back, the second query actually does not violate the second constraint.

To address this issue, the table implementation can maintain minimum fully-checked RowID (i.e., a listing of those rows that successfully passed all constraint checks, etc.). In the example above, when the three constraint checks run in parallel, 4711 would be the last known fully-checked RowID. When the constraint check on 4712-4721 completes first, then this would bump up the last fully-checked RowID to 4721. In case the constraint check on 4722-4726 completes first, the last fully-checked RowID remains at 4711. When the check of 4712-4721 completes, it will bump up the last fully checked RowID to 4726 (because the second constraint check is already done). This feature can help avoid false positives, which in turn cause higher abort rate of transactions and can negatively impact user's applications. If the constraint violation is detected against fully-checked row, then it is a definitive violation. If the violation is detected against not-yet-fully-checked row, the check will be repeated when fully-checked RowID is increased after any necessary previous queries finish their constraint checking. At this point, constraint check is now executing fully parallel, parallelized both inter- and intra-query.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A non-transitory computer program product storing instructions that, when executed by at least one programmable processor, cause the at least one programmable processor to perform operations comprising:
   executing a plurality of operations on tables of an insert-only, in-memory database, at least a portion of the operations being executed in parallel, wherein rows of the database are given monotonically-increasing row identifiers and the database uses multi-version concurrency control, and wherein the operations are selected from a group consisting of insert, update, and delete operations;
   performing, for each operation subsequent to its execution, a constraint check to determine whether data stored in the database affected by the operation is valid, wherein for each insert or update operation the corresponding constraint check is limited to row identifiers existing prior to the execution of the corresponding operation; and
   invalidating operations subsequent to their execution for which the constraint check determines that the data is not valid;
   wherein the constraint checks are parallelized inter-query and are parallelized intra-query.

2. A computer program product as in claim 1, wherein at least a portion of the constraint checks are performed in parallel.

3. A computer program product as in claim 1, wherein invalidating operations comprises:
  executing the corresponding operation in a subtransaction; and
  performing a subtransaction rollback for the corresponding operation in case of a failed constraint check.

4. A computer program product as in claim 1, wherein the operations further comprise:
  identifying, for each row in the database, whether the row has been fully checked; and
  wherein performing the constraint checks comprise:
    determining that an operation violating the constraint check against a row in the database identified as being fully checked indicates a definitive constraint violation; and
    determining that an operation violating the constraint check against a row in the database not identified as being fully checked requires a recheck after the row is fully checked.

5. A computer program product as in claim 4, wherein the operations further comprise:
  repeating the constraint checks if the operation violated a constraint check against a row in the database which was not identified as being fully checked at such time as the corresponding row is identified as being fully checked.

6. A computer program product as in claim 1, wherein the constraint checks are selected from a group consisting of: uniqueness checks, referential integrity checks, and value domain checks.

7. A method comprising:
  executing a plurality of operations on tables of an insert-only, in-memory database, at least a portion of the operations being executed in parallel, wherein rows of the database are given monotonically-increasing row identifiers and the database uses multi-version concurrency control, and wherein the operations are selected from a group consisting of insert, update, and delete operations;
  performing, for each operation subsequent to its execution, a constraint check to determine whether data stored in the database affected by the operation is valid, wherein for each insert or update operation the corresponding constraint check is limited to row identifiers existing prior to the execution of the corresponding operation; and
  invalidating operations subsequent to their operation for which the constraint check determines that the data is not valid;
  wherein referential integrity constraint checks are parallelized intra-query by placing shared locks on referred-to rows before execution of a corresponding operation.

8. A method as in claim 7, wherein at least a portion of the constraint checks are performed in parallel.

9. A method as in claim 7, wherein invalidating operations comprises:
  executing the corresponding operation in a subtransaction; and
  performing a subtransaction rollback for the corresponding operation in case of a failed constraint check.

10. A method as in claim 7, further comprising:
  identifying, for each row in the database, whether the row has been fully checked; and
  wherein performing the constraint checks comprise:
    determining that an operation violating the constraint check against a row in the database identified as being fully checked indicates a definitive constraint violation; and
    determining that an operation violating the constraint check against a row in the database not identified as being fully checked requires a recheck after the row is fully checked.

11. A method as in claim 10 further comprising:
  repeating the constraint checks if the operation violated a constraint check against a row in the database which was not identified as being fully checked at such time as the corresponding row is identified as being fully checked.

12. A method as in claim 7, wherein the constraint checks are selected from a group consisting of: uniqueness checks, referential integrity checks, and value domain checks.

13. A non-transitory computer program product storing instructions that, when executed by at least one programmable processor, cause the at least one programmable processor to perform operations comprising:
  executing a plurality of operations on tables of a database with at least a portion of the operations being executed in parallel, wherein rows of the database are given monotonically-increasing row identifiers and the database uses multi-version concurrency control, and wherein the operations are selected from a group consisting of insert, update, and delete operations;
  performing, for each operation subsequent to its execution, a constraint check to determine whether data stored in the database affected by the operation is valid, wherein the database maintains a listing of those rows that successfully passed all constraint checks, wherein for each insert or update operation the corresponding constraint check is limited to row identifiers existing prior to the execution of the corresponding operation; and
  invalidating operations subsequent to their execution for which the constraint check determines that the data is not valid, wherein the constraint checks are parallelized inter-query and are parallelized intra-query.

14. A system comprising:
  at least one programmable data processor; and
  memory storing instructions which, when executed by the at least one programmable data processor, result in operations comprising:
    executing a plurality of operations on tables of an insert-only, in-memory database, at least a portion of the operations being executed in parallel, wherein rows of the database are given monotonically-increasing row identifiers and the database uses multi-version concurrency control, and wherein the operations are selected from a group consisting of insert, update, and delete operations;
    performing, for each operation subsequent to its execution, a constraint check to determine whether data stored in the database affected by the operation is valid, wherein for each insert or update operation the corresponding constraint check is limited to row identifiers existing prior to the execution of the corresponding operation; and
    invalidating operations subsequent to their execution for which the constraint check determines that the data is not valid;
    wherein the constraint checks are parallelized inter-query and are parallelized intra-query.

15. A system as in claim 14, wherein at least a portion of the constraint checks are performed in parallel.

16. A system as in claim 14, wherein the invalidating comprises:
  executing the corresponding operation in a subtransaction; and performing a subtransaction rollback for the corresponding operation in case of a failed constraint check.

17. A system as in claim 14, wherein the operations further comprise:
   identifying, for each row in the database, whether the row has been fully checked; and wherein performing the constraint checks comprise:
   determining that an operation violating the constraint check against a row in the database identified as being fully checked indicates a definitive constraint violation; and
   determining that an operation violating the constraint check against a row in the database not identified as being fully checked requires a recheck after the row is fully checked.

18. A system as in claim 17, wherein the operations further comprise:
   repeating the constraint checks if the operation violated a constraint check against a row in the database which was not identified as being fully checked at such time as the corresponding row is identified as being fully checked.

19. A system as in claim 14, wherein the constraint checks are selected from a group consisting of: uniqueness checks, referential integrity checks, and value domain checks.

20. A method comprising:
   executing a plurality of operations on tables of a database with at least a portion of the operations being executed in parallel, wherein rows of the database are given monotonically-increasing row identifiers and the database uses multi-version concurrency control, and wherein the operations are selected from a group consisting of insert, update, and delete operations;
   performing, for each operation subsequent to its execution, a constraint check to determine whether data stored in the database affected by the operation is valid, wherein the database maintains a listing of those rows that successfully passed all constraint checks, wherein for each insert or update operation the corresponding constraint check is limited to row identifiers existing prior to the execution of the corresponding operation; and
   invalidating operations subsequent to their execution for which the constraint check determines that the data is not valid, wherein the constraint checks are parallelized inter- query and are parallelized intra-query.

21. A system comprising:
at least one programmable data processor; and
memory storing instructions which, when executed by the at least one programmable data processor, result in operations comprising:
   executing a plurality of operations on tables of a database with at least a portion of the operations being executed in parallel, wherein rows of the database are given monotonically-increasing row identifiers and the database uses multi-version concurrency control, and wherein the operations are selected from a group consisting of insert, update, and delete operations;
   performing, for each operation subsequent to its execution, a constraint check to determine whether data stored in the database affected by the operation is valid, wherein the database maintains a listing of those rows that successfully passed all constraint checks, wherein for each insert or update operation the corresponding constraint check is limited to row identifiers existing prior to the execution of the corresponding operation; and
   invalidating operations subsequent to their execution for which the constraint check determines that the data is not valid, wherein the constraint checks are parallelized inter-query and are parallelized intra-query.

* * * * *